(No Model.)

A. W. HENDRICK.
HAY BINDER.

No. 396,278. Patented Jan. 15, 1889.

Witnesses
Geo. J. Thorpe
R. H. Bishop,

Inventor.
Alexander W. Hendrick
By his Attorneys,

UNITED STATES PATENT OFFICE.

ALEXANDER W. HENDRICK, OF PAW PAW, MICHIGAN.

HAY-BINDER.

SPECIFICATION forming part of Letters Patent No. 396,278, dated January 15, 1889.

Application filed September 22, 1888. Serial No. 286,122. (No model.)

*To all whom it may concern:*

Be it known that I, ALEXANDER W. HENDRICK, a citizen of the United States, residing at Paw Paw, in the county of Van Buren and State of Michigan, have invented a new and useful Improvement in Hay-Binders, of which the following is a specification.

My invention is an improved hay-binder for securing hay upon a hay-rack; and it consists in certain novel features hereinafter described and claimed.

Figure 1:
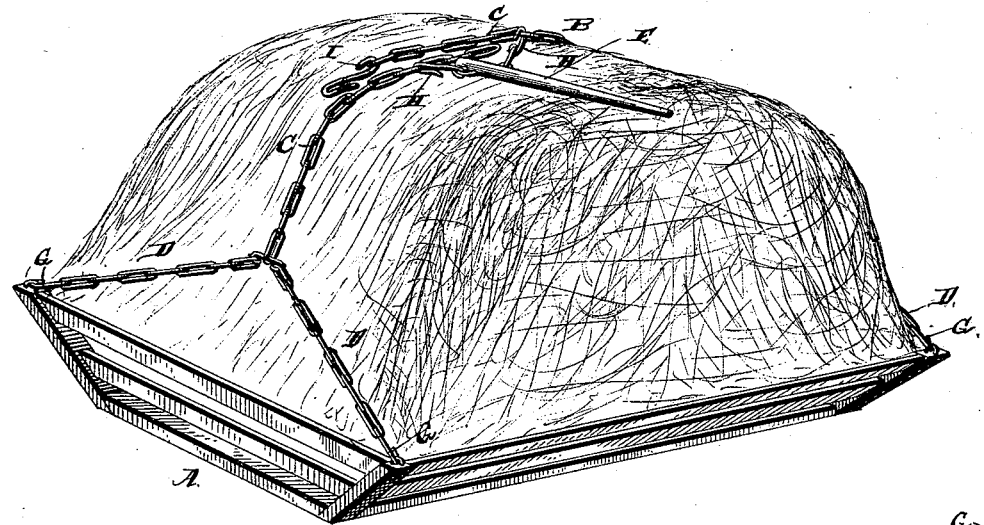
Figure 2:
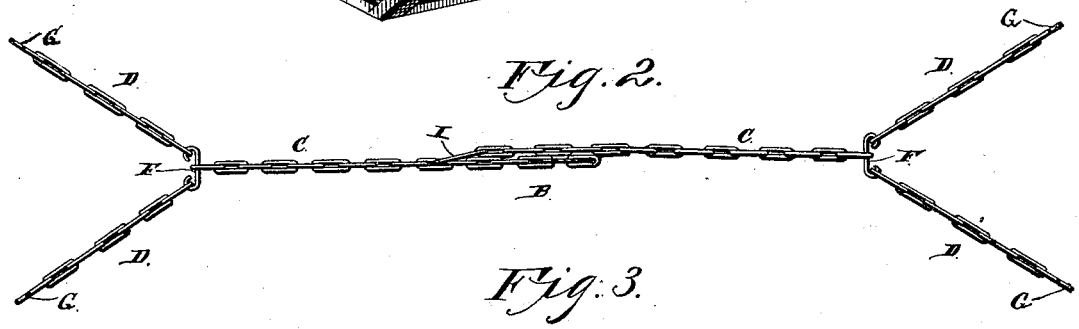
Figure 3:
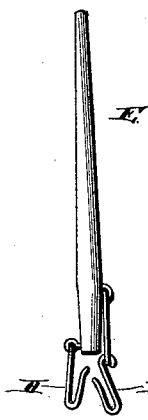

In the drawings, Figure 1 is a perspective view of a hay-rack, showing a load of hay thereon and my improved binder applied thereto. Fig. 2 is a detail view of the binder. Fig. 3 is a detail view of the lever for tightening the binder.

Referring to the drawings by letter, A designates a hay-rack of the usual or any preferred construction.

B designates the improved binder, comprising, essentially, the chains C C, extending longitudinally of the load of hay, the chains D D, extending from the end of the chain C to the corners of the hay-rack, and the lever E, connected to the chains C C and adapted to tighten the said chains on the load of hay. The chains C C have secured to their outer ends the transverse links F, and the inner ends of the chains D are secured to the ends of these links F. The outer ends of these chains D are provided with the hooks G, which are adapted to engage staples or loops at the corners of the hay-rack, as will be readily understood.

The lever E is provided at and near its inner end with the hooks H, which are adapted to engage the inner end of the chains C C, as shown, so that by swinging the said lever in a horizontal plane the said chains will be drawn together and the binder tightened, so as to secure the load of hay firmly on the rack.

In practice the hay is thrown on the rack in the usual manner to form a load. The hooks G at the ends of the chains D are then engaged in staples or similar devices at the corners of the rack, and the said chains carried up over the ends of the load of hay and the chains C C extended longitudinally over the top of the load. The hooks H H on the lever E are then caused to engage the links of the chains C C, and the said lever is then swung in a horizontal plane, so as to draw the chains toward each other. A hook, I, on the end of one of the chains C is then engaged in one of the links of the opposite chain, so as to prevent slacking of the chains, and the load is ready for transportation.

It will be observed that I have provided a very cheap and simple device by which the hay will be firmly secured on the rack and which can be quickly released when it is desired to remove the hay from the rack.

While I have shown and described the device as being composed of chains, it will be readily understood that ropes may be substituted for the chains, and I do not therefore limit myself to the exact construction shown, as it is obvious that many minor changes therein could be made without departing from the invention.

Having thus described my invention, what I claim, and desire to secure by Letters Patent, is—

A hay-binder comprising the central chains, C C, the chains D D, extending from the ends of the chains C C, and adapted to engage the corners of a hay-rack, and the operating-lever provided with hooks near one end which are adapted to engage the chains C C, as set forth.

In testimony that I claim the foregoing as my own I have hereto affixed my signature in presence of two witnesses.

ALEXANDER W. HENDRICK.

Witnesses:
GEO. W. MYERS,
JOHN W. SHANK.